(12) United States Patent
Baker-Salmon

(10) Patent No.: US 6,607,809 B2
(45) Date of Patent: Aug. 19, 2003

(54) GLASS TILE DECORATED ON REAR VIEWED FROM FRONT

(76) Inventor: Chris Baker-Salmon, 146 Clinton Rd., Antrim, NH (US) 03440

( * ) Notice: Subject to any disclaimer, the term of this patent is extended or adjusted under 35 U.S.C. 154(b) by 0 days.

(21) Appl. No.: 09/838,777

(22) Filed: Apr. 18, 2001

(65) Prior Publication Data

US 2002/0001682 A1 Jan. 3, 2002

Related U.S. Application Data

(63) Continuation-in-part of application No. 08/804,333, filed on Feb. 21, 1997, now abandoned.

(51) Int. Cl.[7] .................................................. B32B 3/00
(52) U.S. Cl. ......................... 428/162; 428/161; 428/29; 428/13; 428/67; 428/156; 428/187; 428/542.2; 428/913.3; 428/428; 52/311.1; 52/316; 52/747.11; 40/616; 40/800
(58) Field of Search ............................ 428/13, 29, 38, 428/67, 156, 161, 162, 542.2, 187, 913.3, 426, 428; 52/311.1, 316, 747.1, 747.11; 40/800, 616

(56) References Cited

U.S. PATENT DOCUMENTS 4,318,946 A * 3/1982 Pavone 5,989,246 A * 11/1999 Kaufmann et al.

* cited by examiner

*Primary Examiner*—Deborah Jones
*Assistant Examiner*—Wendy Boss

(57) ABSTRACT

A tile with a transparent glass body having a smooth front face and a three-dimensional design impressed on the rear face that is viewed through the front face. The impressed design is further defined by a layer of decorative glass materials fused to the impressed design as well as some or all of the rear face. An overlay of glass material is fused to and follows the topography of, the decorative glass materials layer and/or the rear face of the glass tile body, sandwiching the decorative glass materials layer between the glass tile body and the glass material overlay. Once fused; the glass material overlay, the decorative glass materials layer and the glass tile body meld to become one homogenous glass layer, comprising the tile, that cannot delaminate. The resulting glass tile is similar in use and durability to ceramic tile while adding the ability to carry a protected, three-dimensional design. The overlay is an interface glass matrix that provides a point of attachment that can support the glass tile module of this invention when the glass tile is attached to a surface to be covered.

15 Claims, 1 Drawing Sheet

GLASS TILE DECORATED ON REAR VIEWED FROM FRONT

This is a continuation-in-part of application Ser. No. 08/804,333, filed Feb. 21, 1997, now abandoned.

BACKGROUND—Field of Invention

This invention relates to a surface covering; specifically incorporating a glass tile with a three dimensional decoration impressed on a rear face and a decorative glass layer and protective layer fused to and following the topography of a rear face while maintaining a smooth, transparent front face.

BACKGROUND—Description of Prior Art

Tiles have been made since ancient times. Most tiles are of a ceramic or stone base and are opaque. Some tiles have been decorated on the front face with two-dimensional designs or plain colors. Some tiles have been glazed on the front face to give a durable, easy to clean, hygienic surface. There are many tiles that incorporate a two-dimensional design and a durable glaze on the front face that are in use today.

Some tiles have a three dimensional relief design cut into the front face. Even if this design is glazed, it is harder to clean a three dimensional design than a smooth surface. Where ease in cleaning is critical, a tile with a three dimensional design on the front face will be avoided.

Tiles have been made of glass with either a smooth front face or a three dimensional relief design cut in the front face. This type of tile has been made out of opaque glass or an opacifier has been used to obscure the adhesive on the rear face. Tiles have been made with a three-dimensional design cut in the rear face but without a multicolored decorative glass layer fused to the tile body or a protective glass layer fused to the rear face of the decorative glass layer and/or the rear face of the glass tile body. The high temperature fusing of the glass layers to the glass body creates a tile that is homogenous glass through the tile thickness. The high temperature fusing process makes the layers of glass become physically and chemically one continuous piece of glass that forms the tile. Without the addition of the fused glass layers, as in my new tile, the existing tile is limited in many ways such as decorative designs and possible installation techniques.

Tiles have been made of mirrored sheet glass that is smooth on both front and rear faces with silvering and/or a two dimensional design as well as a protective coating applied to the rear face. Mirror tiles have not been made to match in thickness, in shape or in durability, other types of tiles. These differences limit the use of mirror tiles with other types of tile as they are harder to match with other tiles and are installed with different techniques. The mirror coating and protective coating on the backs of these mirror tiles are not made of glass fused to the decorative layer or to the sheet glass body of the mirror and so not homogenous glass. A special adhesive needs to be used to install the mirror tiles because of the fragile nature of the protective coating. Of course the largest limitation, compared to my new tile, is that there is not a three dimensional component to the design.

There is a traditional technique of painting on the back of sheet glass and viewing from the front. This is not used as a surface covering in the way a tile is used. As the sheet glass painted on the back viewed from the front could be used as a surface covering I am including it here. Its limitations are similar to the mirror glass tiles—they are not made to be able to be mixed with other tiles because of thickness, shape and because the colored decoration is simply painted and not glass fused to the back and there is no protective overlay fused to the back there will be installation limitations. Again the largest difference is the lack of a three dimensional design capability.

By combining the different aspects of prior art listed above I have developed an object that I have never seen before and that I could not find in my research of prior art. By combining the aspects of a. a raised three-dimensional pattern b. impressed on the rear face of a c. transparent glass tile body and a d. decorative glass materials layer and an e. overlay of glass material fused to the decorative layer and/or fused to the glass tile body f. which creates an homogenous glass through the tile thickness to support this new tile using g. existing standard tile masonry installation techniques without the possibility of delamination; this new tile is capable of new uses that would be impossible for related prior art.

Prior tile art is unable to carry a three dimensional design while maintaining a smooth, easy to clean front face while protecting intricate decorative material. Yet this new tile is of predetermined dimensions and the layers fused, melding and eliminating the discrete layers, making the tile physically unable to delaminate so that it is able to be installed in conjunction with prior tile art especially as this new tile will be installed with the same techniques as prior tile art.

Although particular aspects listed above may be incorporated in prior art, it is the combination of all of these aspects in the way I have described that allows for the distinct advantages of this new tile over prior art.

OBJECTS AND ADVANTAGES

Accordingly, several objects and advantages of my invention are to produce an easy to clean, very durable, smooth surface on a tile that incorporates a three dimensional design. A three dimensional design impressed in and applied to the rear face but viewed from the smooth front face of this tile is what so removes this startling visual effect from what has been available in prior art. By impressing a three dimensional design and applying layers or, partial layers, of colored powdered glass decoration fused on the rear face; much finer detail can be employed without the fear of these details being abraded or worn away through cleanings or general use. The thick layer of glass that makes up the body of this article protects the fine details. The smooth front face of the transparent glass body of this article makes the fine details visible.

Other aspects and advantages are the general shape, thickness and durability of this new type of tile along with the homogenous character of the fused, fired, finished tile where delamination is physically impossible, which will allow this tile to be installed with standard ceramic and stone tile installation techniques. This compatibility with existing tile types broadens the application options of my new tile.

A method for covering a surface with modules of a modular surface covering so that a resulting exterior surface appears to have a raised three dimensional pattern but the resulting exterior surface is actually smooth includes the steps of: a. affixing a module of the modular surface covering to a surface to be covered; b. wherein said module of said modular surface covering is affixed in close proximity to other modules used to cover said surface to be covered; c. wherein said module of said modular surface covering is of a thickness, shape and durability to be compatible with ceramic tile modular surface covering; d. wherein said modular surface covering approximates the topography of a surface to be covered wherein said module of said modular surface covering consists of: a translucent glass body that is smooth on a front face with a raised three dimensional pattern on a rear face; and a decorative layer consisting of at least one glass material fused to the raised three dimensional pattern and the rear face of the translucent glass body, that is viewed through the front face of the translucent glass body and; an overlay, fused to and sandwiching the decorative layer between the overlay and the translucent glass body and consisting of at lest one glass material, that comprises a rear surface of the modular surface covering which follows a topography of the rear face and the decorative layer wherein the overlay protects the modular surface covering and is an interface of the rear surface and a means of affixing the modules of the modular surface covering to a surface to be covered, wherein each module of the modular surface covering becomes one homogenous layer of glass, providing a smooth surface covering with a visible raised three dimensional pattern.

Still other objects and advantages will become apparent from a consideration of the ensuing description and drawings.

BRIEF DESCRIPTION OF THE DRAWINGS

FIG. 1 is a perspective view. FIG. 2 is an exploded view. FIG. 3 is a side view.

Figure 1:
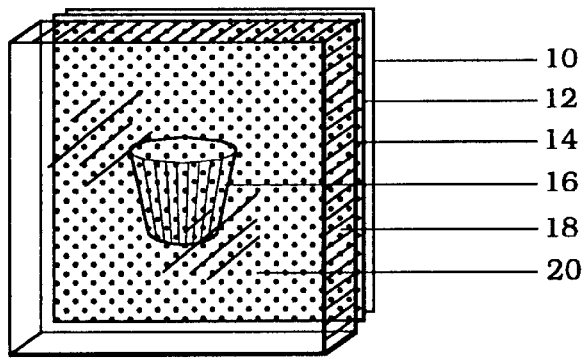
FIGS. 1 to 3 show various aspects of a modular surface covering with a three-dimensional design impressed on a rear face viewed from a front face.

REFERENCE NUMERALS IN DRAWINGS 10 overlay   12 decorative layer   14-rear face of glass body
16 three dimensional relief pattern   18 glass body
20 smooth front face   22 decoration of three-dimensional relief pattern
28 three dimensional overlay

DESCRIPTION FIGS. 1 TO 3

Figure 2:
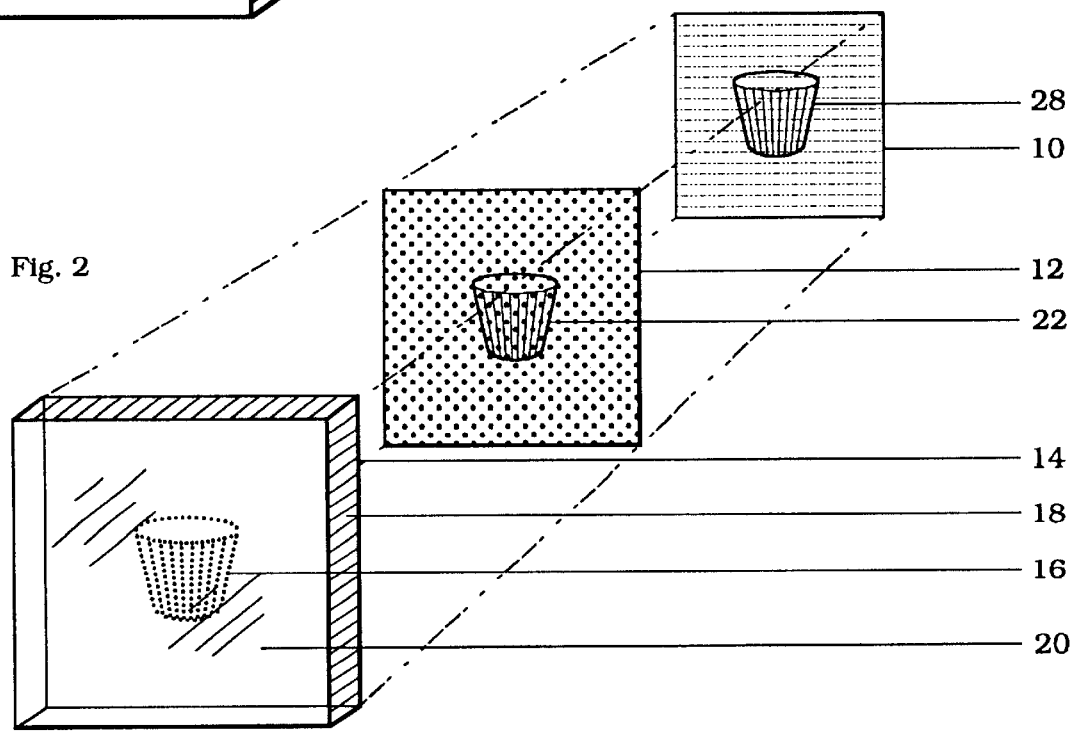
Figure 3:
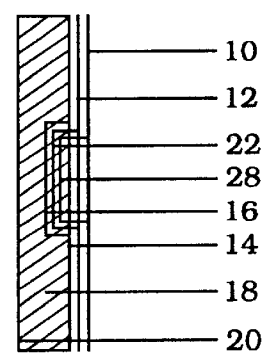

Typical embodiment of the modular surface covering or tile of the present invention is illustrated in FIG. 1 (perspective view), FIG. 2 (exploded view) and FIG. 3 (side view). The tile has a glass body 18 which is transparent and has a three-dimensional relief pattern 16 on the rear face 14. In the preferred embodiment the three dimensional relief pattern 16 is impressed in the hot glass body 18 of the tile during the glass forming process.

The decorative layer 12 includes the decoration of the three dimensional relief pattern 22 and consists of different types of glass material applied, fired and fused to part or all of the rear face of the glass body 14. The different types of glass material used would have different reflective and color properties, different opacities, different textures any number of different qualities to produce the desired visual effect viewed from the smooth front face 20 of the tile.

The overlay 10, which includes the three dimensional overlay 28, sandwiches the decorative layer 12 between the overlay 10 and the glass body 18. The overlay 10 and the three dimensional overlay 28 comprise the rear surface of the tile unit. The overlay 10 and the three dimensional overlay 28 follow the topography of the decorative layer 12 and the decoration of three dimensional relief pattern 22. The overlay 10 acts as a point of attachment for the tile unit of this invention and the means of attaching the tile unit to the surface to be covered with tiles of this invention. The overlay 10 fuses to the decorative layer 12 and/or fuses to the glass body 18. Once the overlay 10, decorative layer 12 and glass body 18 are fired and fused together they become one piece of glass through the thickness of the tile. The firing and fusing process melds the overlay 10, the decorative layer 12 and the glass body into one homogenous piece of glass that cannot be delaminated. The overlay 10 and the decorative layer 12 consists of any glass material or combination of glass materials. The glass material in the overlay 10 could give a matted texture to the rear face of the tile unit, which is the interface with the installation adhesive, if desired.

SUMMARY, RAMIFICATIONS AND SCOPE

Accordingly, the reader will see that the glass tile of this invention can be used to create a surface covering that presents a smooth, durable face for ease in maintenance. In addition the surface covering can carry intricate designs that are protected behind the transparent glass tile body—to display designs with startling effect.

Further more the glass tile of this invention can be installed to cover any surface that can be covered with prior ceramic tile art, as the glass tile of this invention uses the same installation techniques, general shape, thickness and durability as prior ceramic tile art.

Many different shapes are possible including: squares, rectangles, trapezoids, stars and other geometric shapes that will fit together to form a surface covering as in prior tile design. These shapes may be used together to form horizontal or vertical accent bands when the bulk of the surface covering is of ceramic tile. The ability of the new tile of this invention to carry intricate decorative designs in a three dimensional pattern safely; makes this tile the perfect accent tile in many applications. Until this new tile was invented, the architect or designer or tile mason had to be content with specifying tile that could not possibly carry the finely detailed, three dimensional designs able to be carried in this new tile because it would be unsafe in almost any application. This new tile with its massive, solid glass protection and its smooth glass front face make the use of fine detail and intricate designs, safe in almost any application.

The rear face of the tile unit is comprised of an overlay consisting of glass powder spread over the decorative powdered glass layer and/or the rear face of the glass tile body. The glassy overlay is the point of attachment for tile installation material. The glassy overlay and decorative glass layer once fired on and fused to the rear face of the glass tile body could never delaminate as the tile unit becomes homogenous glass through the entire thickness of the tile.

Although the description above contains many specificities, these should not be construed as limiting the scope of the invention but merely providing illustrations of some of the preferred embodiments of this invention. Thus the scope of the invention should be determined by the appended claims and their legal equivalents, rather than by the examples given.

I claim:
1. A modular surface covering consisting of:
   a. a translucent glass body that is smooth on a front face with a raised three dimensional pattern on a rear face and
   b. a decorative layer consisting of at least one glass material fused to said raised three dimensional pattern and said rear face of said translucent glass body, that is viewed through said front face of said translucent glass body and
   c. an overlay, fused to and sandwiching said decorative layer between said overlay and said translucent glass body and consisting of at least one glass material, that comprises a rear surface of said modular surface covering which follows a topography of said rear face and said decorative layer wherein said overlay protects said modular surface covering and is an interface of said rear surface and a way of affixing a module of said modular surface covering to a surface to be covered, wherein each said module of said modular surface covering is one homogenous layer of glass, providing a smooth surface covering with a visible said raised three dimensional pattern.

2. The modular surface covering of claim 1 wherein said translucent glass body is transparent.

3. The modular surface covering of claim 1 wherein said decorative layer, sandwiched between and fused to said translucent glass body and said overlay, consists of at least one colored glass material, that augments said raised three dimensional pattern on said rear face of said translucent glass body.

4. The modular surface covering of claim 1 wherein said overlay consists of at least one glass material wherein said overlay fuses to said decorative layer and said translucent glass body wherein said rear surface of said overlay is able to support said way of affixing said module of said modular surface covering to said surface to be covered.

5. The modular surface covering of claim 1 wherein said glass material of said decorative layer consists of at least one colored glass material, and said glass material of said overlay, consist of glass particles heated to a point where said glass body is fused to said decorative layer and said overlay wherein said overlay, said decorative layer and said glass body meld to become an homogenous glass said module of said modular surface covering.

6. The modular surface covering of claim 1 wherein said translucent glass body is composed substantially of post-consumer recycled glass.

7. A tile consisting of:
  a. a translucent glass body that is smooth on a front face with a raised three dimensional pattern on a rear face and
  b. a decorative layer consisting of at least one glass material fused to said raised three dimensional pattern and said rear face of said translucent glass body, that is viewed through said front face of said translucent glass body and
  c. an overlay, fused to and sandwiching said decorative layer between said overlay and said translucent glass body and consisting of at least one glass material, that comprises a rear surface of said tile which follows a topography of said rear face and said decorative layer wherein said overlay protects said tile and is an interface of said rear surface and a way of affixing said tile to a surface to be covered, wherein each said tile becomes one homogenous layer of glass, providing a smooth surface covering with a visible said raised three dimensional pattern.

8. The tile of claim 7 wherein said translucent glass body is transparent.

9. The tile of claim 7 wherein said decorative layer, sandwiched between and fused to said translucent glass body and said overlay, consists of at least one colored glass material, that augments said raised three dimensional pattern on said rear face of said translucent glass body.

10. The tile of claim 7 wherein said glass material of said decorative layer consists of at least one colored glass material, and said glass material of said overlay, consist of glass particles heated to a point where said glass body is fused to said decorative layer and said overlay wherein said overlay, said decorative layer and said glass body meld to become an homogenous glass unit of said tile.

11. The tile of claim 7 wherein said translucent glass body is composed substantially of post-consumer recycled glass.

12. A method for covering a surface with modules of a modular surface covering so that a resulting exterior surface appears to have a raised three dimensional pattern but said resulting exterior surface is actually smooth comprising the steps of:
  a. affixing a first said module of said modular surface covering to a surface to be covered, wherein said first module of said modular surface covering is of a thickness, shape and durability to be compatible with ceramic tile modular surface covering, approximates a topography of a surface to be covered, and consists of:
    i. a translucent glass body that is smooth on a front face with a raised three dimensional pattern on a rear face;
    ii. a decorative layer consisting of at least one glass material fused to said raised three dimensional pattern and said rear face of said translucent glass body, that is viewed through said front face of said translucent glass body; and
    iii. an overlay, fused to and sandwiching said decorative layer between said overlay and said translucent glass body and consisting of at least one glass material, that comprises a rear surface of said modular surface covering which follows a topography of said rear face and said decorative layer wherein said overlay protects said modular surface covering and is an interface of said rear surface and a way of affixing said modules of said modular surface covering to a surface to be covered, wherein each said module of said modular surface covering is one homogenous layer of glass, providing a smooth surface covering with a visible said raised three dimensional pattern; and
  b. affixing a second module of said modular surface covering in close proximity to said first module wherein each said module is used to cover said surface to be covered.

13. The method for covering a surface of claim 12 wherein said translucent glass body is transparent.

14. The method for covering a surface of claim 12 wherein said decorative layer, sandwiched between and fused to said translucent glass body and said overlay, consists of at least one colored glass material, that augments said raised three dimensional pattern on said rear face of said translucent glass body.

15. The method for covering a surface of claim 12 wherein said glass material of said decorative layer consists of at least one colored glass material, and said glass material of said overlay, consist of glass particles heated to a point where said glass body is fused to said decorative layer and said overlay wherein said overlay, said decorative layer and said glass body meld to become an homogenous said module of said modular surface covering.

* * * * *